(12) United States Patent
Zhou

(10) Patent No.: US 8,300,958 B2
(45) Date of Patent: Oct. 30, 2012

(54) SYSTEM AND METHOD FOR DETECTING SCROLLING TEXT IN MIXED MODE FILM AND VIDEO

(75) Inventor: Zhi Zhou, Corona, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1509 days.

(21) Appl. No.: 11/776,469

(22) Filed: Jul. 11, 2007

(65) Prior Publication Data

US 2009/0016618 A1  Jan. 15, 2009

(51) Int. Cl.
*G06K 9/36* (2006.01)
*G06K 9/46* (2006.01)

(52) U.S. Cl. ........ 382/232; 382/248; 382/251; 382/254; 382/255; 348/448; 348/701; 375/240.16

(58) Field of Classification Search .................. 375/240; 348/96–102; 382/232
See application file for complete search history.

(56) References Cited

U.S. PATENT DOCUMENTS

| | | | |
|---|---|---|---|
| 6,297,858 B1 * | 10/2001 | Yang | 348/731 |
| 7,079,159 B2 | 7/2006 | Yang | |
| 7,499,102 B2 * | 3/2009 | Lee et al. | 348/441 |
| 7,602,441 B1 * | 10/2009 | He et al. | 348/449 |
| 8,063,984 B2 * | 11/2011 | Yamauchi | 348/448 |
| 2005/0053140 A1 * | 3/2005 | Holcomb et al. | 375/240.16 |
| 2005/0168653 A1 * | 8/2005 | Wyman | 348/700 |
| 2005/0243933 A1 * | 11/2005 | Landsiedel et al. | 375/240.16 |
| 2005/0249282 A1 * | 11/2005 | Landsiedel et al. | 375/240.12 |
| 2007/0133685 A1 * | 6/2007 | Seong et al. | 375/240.16 |
| 2008/0151108 A1 * | 6/2008 | Doswald | 348/456 |
| 2009/0153742 A1 * | 6/2009 | Hofman | 348/699 |
| 2010/0034272 A1 * | 2/2010 | Miyazaki et al. | 375/240.16 |
| 2010/0254605 A1 * | 10/2010 | Wredenhagen | 382/176 |
| 2010/0277644 A1 * | 11/2010 | Blume | 348/452 |

OTHER PUBLICATIONS

Young Ho Lee, Judder-Free Reverse Pull Down Using Dynamic compensation, Feb. 2005, IEEE, vol. 51, pp. 2-4.*
U.S. Appl. No. 12/403,182 and filing receipt, filed Mar. 12, 2009.

* cited by examiner

*Primary Examiner* — Nathan Flynn
*Assistant Examiner* — Viral Lakhia

(57) ABSTRACT

Various embodiments of a system are provided for detecting scrolling text in a mixed-mode video sequence. The system of certain embodiments includes a motion estimator that generates a plurality of motion vectors between blocks of two or more extracted frames of a mixed-mode video sequence. An extracted frame motion analyzer analyzes the motion vectors to detect substantially constant motion of at least some of the blocks between the two or more extracted frames, wherein the presence of substantially constant motion is indicative of the presence of scrolling text in the mixed-mode video sequence. A consecutive frame motion analyzer calculates differences in pixel values between blocks of two or more consecutive frames in the mixed-mode video sequence, wherein the differences in pixel values are further indicative of the presence of scrolling text in the mixed-mode video sequence.

22 Claims, 8 Drawing Sheets

SYSTEM AND METHOD FOR DETECTING SCROLLING TEXT IN MIXED MODE FILM AND VIDEO

BACKGROUND

1. Field of the Invention

This disclosure is related to video processing, and more particularly, to detecting scrolling text in a mixed-mode video sequence.

2. Description of the Related Technology

Multimedia processing systems, such as video encoders, may encode multimedia data using encoding methods based on international standards such as MPEG-x and H.26x standards. Such encoding methods generally are directed to compressing the multimedia data for transmission and/or storage and may combine both progressive and interlaced (non-progressive) sequences. Compression is, broadly speaking, the process of removing redundancy from the data. In addition, video display systems may transcode or transform multimedia data for various purposes such as, for example, to ensure compatibility with display standards such as NTSC, HDTV, or PAL, to increase frame rate in order to reduce perceived motion blur, and to achieve smooth motion portrayal of content with a frame rate that differs from that of the display device. These transcoding methods may perform similar functions as the encoding methods for performing frame rate conversion, de-interlacing, and the like.

A video signal can be described in terms of a sequence of pictures, which include frames (each frame being an entire picture), or fields (e.g., an interlaced video stream comprises fields of alternating odd or even lines of a picture). A frame may be generally used to refer to a picture, a frame or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. Depending on context, a block may refer to either a macroblock or a subblock, or even a single pixel.

Video sequences may be received by a receiving device in a compressed format and subsequently decompressed by a decoder in the receiving device. Video sequences may also be received in an uncompressed state. In either case, the video sequence is characterized at least by a frame rate, and a horizontal and vertical pixel resolution. Many times, a display device associated with the receiving device may require a different frame rate and/or pixel resolution and video reconstruction of one or more video frames may be performed. Reconstruction of video frames may comprise estimating a video frame between two or more already received (or received and decompressed) video frames. Furthermore, decoder devices may create new video data based on already reconstructed video data.

Frame rate conversion by pulldown is one example of new video data creation. Pulldown comprises repeating source frames in a known pattern to generate an output video signal which possesses more frames than the original. For example, when film is transferred to video, 24 frames per second of film are converted to 60 fields per second of video by "stretching" four frames of film to fill five frames of video. For instance, in an NTSC frame, there are two complete fields for each frame displayed, resulting in ten fields for every four film frames. In 3:2 pulldown, for example, one film frame is used across three fields, the next across two, the next across three, and so on. The cycle repeats itself completely after four film frames have been processed. In interlaced (non-progressive) pulldown, the two fields correspond to the even and odd interlaced fields, while in progressive pulldown, the two fields correspond to the complete frame.

One disadvantage of the 3:2 pulldown process is that it creates a slight error in the video signal compared to the original film frames that can be seen in the final image. As a result, the output video signal appears less smooth than the original version. This error is referred to as "motion judder" and may be corrected by the process of motion judder cancellation. Motion judder cancellation extracts frames from the output video signal and performs a new frame rate conversion on the extracted frames, resulting in a smooth video sequence.

SUMMARY OF CERTAIN INVENTIVE ASPECTS

Certain embodiments of a method of detecting scrolling text in a mixed-mode video sequence include generating a plurality of motion vectors between blocks of two or more extracted frames of a mixed-mode video sequence, analyzing the motion vectors to detect substantially constant motion of at least some of the blocks between the two or more extracted frames, where the presence of substantially constant motion is indicative of the presence of scrolling text in the mixed-mode video sequence, and calculating differences in pixel values between blocks of two or more consecutive frames in the mixed-mode video sequence, where the differences in pixel values are further indicative of the presence of scrolling text in the mixed-mode video sequence.

In an embodiment, generating a plurality of motion vectors between blocks of two extracted frames of a mixed-mode video sequence includes generating a first motion vector between a block of a first extracted frame and a corresponding block in a second extracted frame, and generating a second motion vector between a block of a second extracted frame and a corresponding block in a third extracted frame. Analyzing the motion vectors to detect substantially constant motion of at least some of the blocks between the two or more extracted frames can include calculating a first temporal distance between the first and second extracted frames and a second temporal distance between the second and third extracted frames.

Calculating the scrolling text indicator in certain embodiments includes determining whether a product of the first motion vector and the second temporal distance and a product of the second motion vector and the first temporal distance are substantially equal. Analyzing the motion vectors to detect substantially constant motion of at least some of the blocks between the two or more extracted frames can also include calculating a scrolling text indicator responsive to the first and second motion vectors and the first and second temporal distances, wherein the scrolling text indicator is indicative of the presence of scrolling text in the first and second extracted frames.

In addition, analyzing the motion vectors to detect substantially constant motion of at least some of the blocks between the two or more extracted frames in some embodiments includes evaluating whether a peak number of blocks in a histogram of motion vector values exceeds a predetermined threshold, wherein the peak number of blocks provides an indicator of the likelihood of the existence of scrolling text in the first and second extracted frames.

Calculating differences in pixel values between blocks of two or more consecutive frames in the mixed-mode video sequence can include calculating a first difference in pixel values between blocks at the same position in a first consecutive frame and in a previous consecutive frame. Moreover, calculating differences in pixel values between blocks of two or more consecutive frames in the mixed-mode video sequence can also include calculating a second difference in pixel values between blocks at offset positions in the first consecutive frame and in the previous consecutive frame.

In various embodiments, the method also includes comparing the first difference to the second difference, wherein a greater first difference than the second difference is indicative of the presence of scrolling text in the first and second consecutive frames. The offset includes, in some implementations, a line motion vector comprising a sum of first and second motion vectors divided by a sum of first and second temporal distances. In addition, the method may also include evaluating a standard deviation of pixel values in one or more blocks of the consecutive frames, where the standard deviation is further indicative of the presence of scrolling text in the block. One or more of the consecutive frames can be an extracted frame. Furthermore, the pixel values of certain embodiments are intensity values.

In some implementations, a method of identifying scrolling text in a mixed-mode video includes generating a plurality of motion vectors between corresponding blocks of a plurality of frames in a mixed-mode video and analyzing the motion vectors so as to detect substantially constant motion in a single direction, where the substantially constant motion is indicative of the presence of scrolling text in the mixed-mode video. The method may also include calculating differences in pixel values between blocks at the same position in a first frame and in a previous frame, where the differences in pixel values are further indicative of the presence of scrolling text in the mixed-mode video sequence. In addition, analyzing the motion vectors so as to detect substantially constant motion in a single direction can include analyzing the motion vectors in a location of the frames that corresponds to a border.

Various embodiments of a system are provided for detecting scrolling text in a mixed-mode video sequence. The system of certain embodiments includes a motion estimator that generates a plurality of motion vectors between blocks of two or more extracted frames of a mixed-mode video sequence. An extracted frame motion analyzer analyzes the motion vectors to detect substantially constant motion of at least some of the blocks between the two or more extracted frames, where the presence of substantially constant motion is indicative of the presence of scrolling text in the mixed-mode video sequence. A consecutive frame motion analyzer calculates differences in pixel values between blocks of two or more consecutive frames in the mixed-mode video sequence, where the differences in pixel values are further indicative of the presence of scrolling text in the mixed-mode video sequence.

DETAILED DESCRIPTION OF CERTAIN INVENTIVE EMBODIMENTS

Specific embodiments of the inventions will now be described with reference to the drawings. These embodiments are intended to illustrate, and not limit, the inventions described herein. The scope of the inventions is defined by the claims. In this description, reference is made to the drawings wherein like parts are designated with like numerals throughout.

Figure 1:
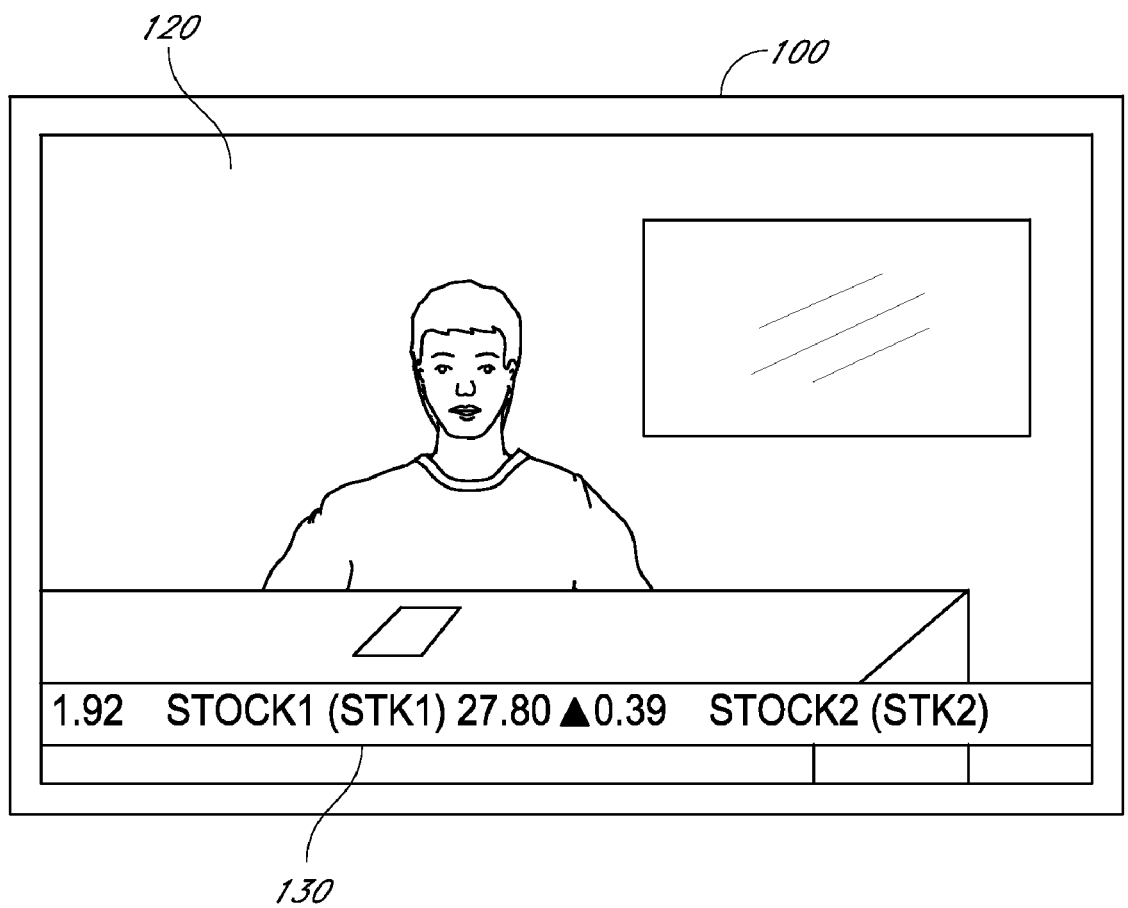
FIG. 1 illustrates a screen display with video and scrolling text.

In post-production processes, media studios occasionally add scrolling text to a film, which may be a video, movie, television show, or the like. This scrolling text might include captions or tickers that move across a video display. An example of scrolling text 130 is shown in FIG. 1. In the particular example shown, the scrolling text 130 is a ticker that includes information about stocks. The scrolling text 130 overlays a film 120 being shown on a display 100. The scrolling text 130 may also include news stories, sports scores, closed-caption text, or the like.

Although the scrolling text 130 is shown moving horizontally over the display, the scrolling text may also move vertically or move both horizontally and vertically. While the various embodiments described herein may be applied to vertical and combinations of horizontal and vertical scrolling text, the remainder of this disclosure will refer only to the example embodiment of detecting horizontal scrolling text.

Since the scrolling text is often added in post-production, the scrolling text is mixed with a video signal that has already been through a 3:2 pulldown process. While other pulldown processes may be used, such as a 2:3 pulldown, 3:3:4 pulldown, or the like, the remainder of this specification will discuss example embodiments using a 3:2 pulldown process. The resulting signal from this process may be referred to as a mixed-mode video sequence. Motion judder cancellation is then applied to the mixed-mode video sequence. However, conventional motion judder cancellation can introduce judder in the scrolling text. Judder occurs in the scrolling text, but not the film, because the scrolling text is moving through frames where the film is not moving.

Figure 2:
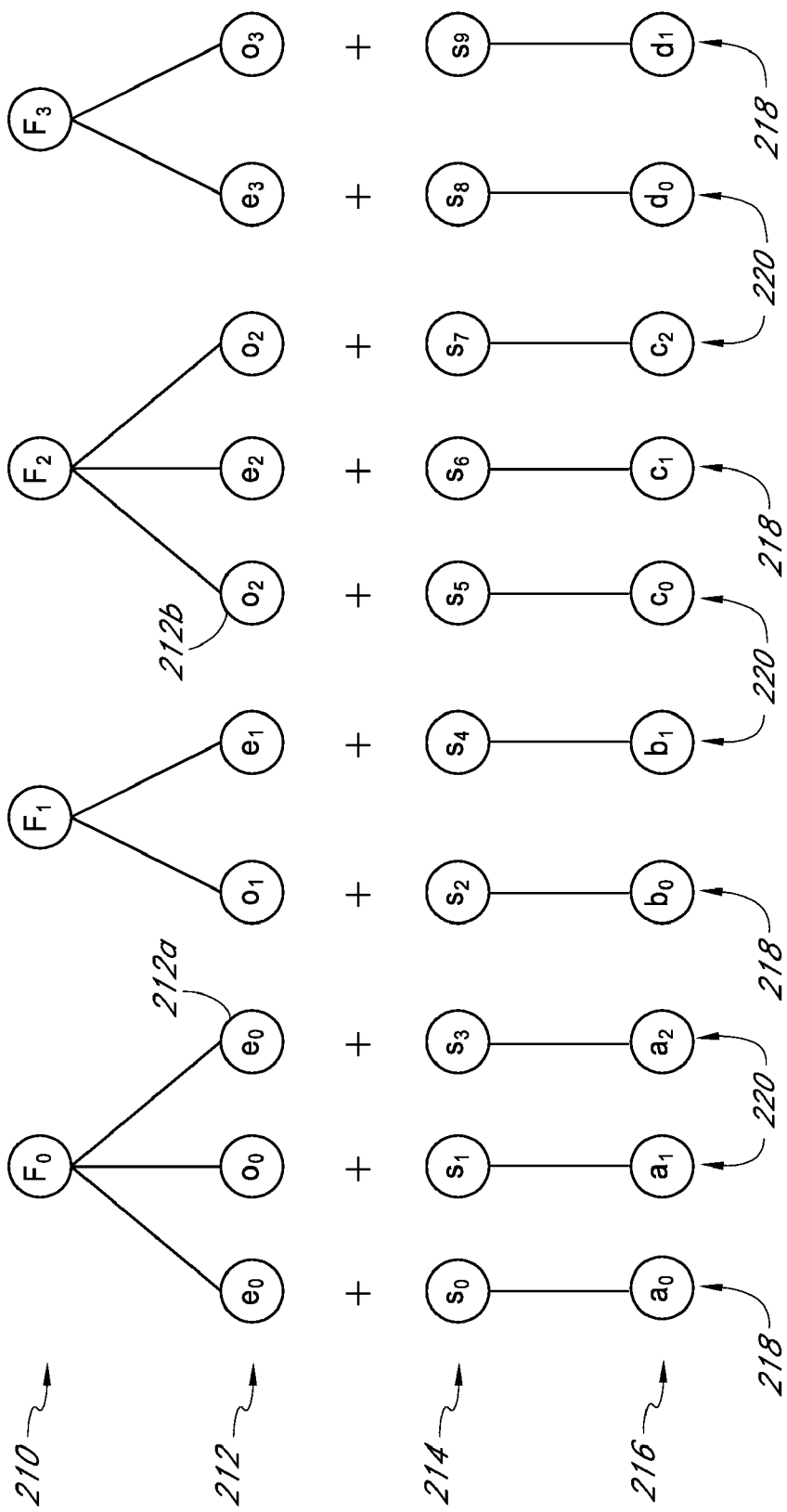
FIG. 2 is a block diagram illustrating an embodiment of progressive-scan mixed mode video sequence generation.

To illustrate this problem, FIG. 2 conceptually depicts the generation of an example mixed-mode video signal. A series of digitized film frames 210, denoted $F_0$, $F_1$, $F_2$, and $F_3$, are split into sets of even (e.g., $e_0$) and odd (e.g., $o_0$) fields 212 in a 3:2 pulldown process. The 3:2 pulldown process creates three alternating even and odd fields 212 for the first film frame $F_0$ 210, two alternating odd and even fields 212 for the second film frame $F_1$ 210, and so on. Each field 212 represents half or approximately half of the information in a particular frame 210.

Scrolling text frames (e.g., $s_0$, $s_1$, etc.) 214 are then added to the odd and even fields 212 to create a mixed-mode video sequence (not shown). The scrolling text frames 214 in one embodiment are different from each other, such that there can be motion between each scrolling text frame 214. This motion contrasts with the even and odd fields 212 within a particular three- or two-field set. As a result, if conventional motion judder cancellation were to be applied to the mixed-mode video sequence, the film information contained in the mixed-mode video sequence would appear smooth, whereas judder might be introduced into the scrolling text portion of the mixed-mode video sequence.

The mixed-mode video sequence may then be deinterlaced to create a progress-scan version of the mixed-mode video sequence, namely the progressive-scan frames 216. In one embodiment, deinterlacing is performed by interpolating the mixed-mode video sequence into progressive-scan frames 216. Effectively, each progressive-scan frame 216 approximates the combined even/odd field 212 and scrolling text frame 214 it was derived from. Thus, for example, the progressive-scan frames $a_0$, $a_1$, and $a_2$ 216 might all appear similar to the film frame $F_0$ 210, with the addition of scrolling text. The progressive-scan frames 216 are also repeated in sets of three frames and two frames. Because the progressive-scan frames 216 repeat, in one embodiment there is no motion in the film part of the mixed-mode video sequence between frames of a particular three- or two-frame set.

In various embodiments, scrolling text 214 may be detected in the mixed-mode video sequence. Detection may be desirable because a video receiver may not receive an indication of what part of the video stream contains scrolling text. Detecting the scrolling text beneficially allows motion judder cancellation to be applied differently to the film and scrolling text. As a result, the post-cancellation mixed-mode video sequence may be perceived as having smooth film and smooth scrolling text. In other embodiments, the motion judder cancellation can alternatively be deactivated in response to detecting scrolling text 214 so that the scrolling text 214 appears smooth.

In one embodiment, scrolling text may be detected by analyzing extracted frames 218 and non-extracted frames 220. The extracted frames 218 of certain embodiments are the first frame in each set of three or two frames in the progressive scan version of the mixed-mode video sequence. Thus, the depicted example extracted frames 218 of the mixed-mode video sequence are $a_0$, $b_0$, $c_0$, and $d_0$. Changes in film information can occur between the extracted frames 220 because each extracted frame 220 is the first frame in a three- or two-frame set that were derived from a single original frame.

The non-extracted frames 220 are the remaining frames. In one embodiment, no change in film information occurs between the non-extracted frames 220. However, changes in the scrolling text information can occur between both the extracted and non-extracted frames 218, 220. Advantageously, the extracted and non-extracted frames 218, 220 can therefore be analyzed to detect scrolling text in a mixed-mode video sequence, as will be discussed in further detail below with respect to FIG. 4.

Figure 3:
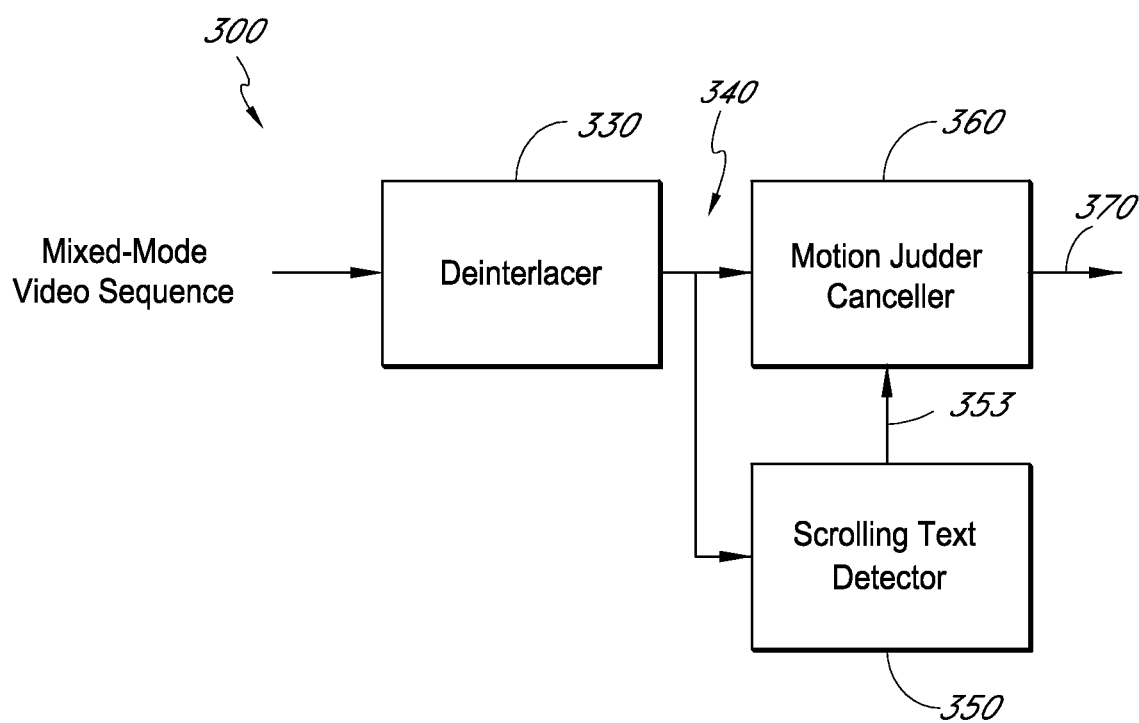
FIG. 3 is a functional block diagram illustrating an embodiment of a mixed-mode video system.

FIG. 3 illustrates an embodiment of a mixed-mode video system 300. The mixed-mode video system 300 facilitates detecting scrolling text in a mixed-mode video sequence. In various embodiments, one or more of the components in the mixed-mode video system 300 may be implemented as software in an embedded system or embedded computer. For example, the mixed-mode video system 300 may be implemented in a television set or the like.

In an embodiment, the deinterlacer 330 receives a mixed-mode video sequence that includes digitized film and scrolling text components. In one implementation, the mixed-mode video sequence is received from a cable network, a satellite television provider, an HDTV television broadcaster, an analog television broadcaster, or the like. The deinterlacer 330 interpolates the film information in the mixed-mode video sequence to create a progressive-scan mixed-mode video sequence 340. The deinterlacer 330 provides the progressive-scan mixed-mode video sequence 340 to a scrolling text detector 350 and to a motion judder canceller 360. It will be noted that in some embodiments, the mixed-mode video sequence may already be in progressive-scan form. In these embodiments, the deinterlacer 330 may be omitted from the mixed-mode video system 300.

The scrolling text detector 350 of various embodiments analyzes extracted and non-extracted frames in the mixed-mode video sequence to detect scrolling text. In one embodiment, the scrolling text detector generates a plurality of motion vectors between blocks of two or more extracted frames of the mixed-mode video sequence. The scrolling text detector 350 then analyzes the motion vectors to detect substantially constant motion of at least some of the blocks between the extracted frames. The presence of substantially constant motion in certain embodiments is indicative of the presence of scrolling text. In addition, the scrolling text detector 350 may calculate differences in pixel values between blocks of two or more consecutive frames in the mixed-mode video sequence. These differences in pixel values may be further indicative of the presence of scrolling text in the mixed-mode video sequence. Implementations of scrolling text detection are described in greater detail below with respect to FIGS. 4 through 8.

The scrolling text detector 350 provides an output 353 indicating the presence of scrolling text to the motion judder canceller 360. In response to receiving the output 353, the motion judder canceller 360 cancels judder in the scrolling text and/or in the film. Consequently, the mixed-mode video system 300 of certain embodiments enables both film and scrolling text in a mixed-mode video sequence to be viewed without motion judder or with reduced motion judder.

Figure 4:
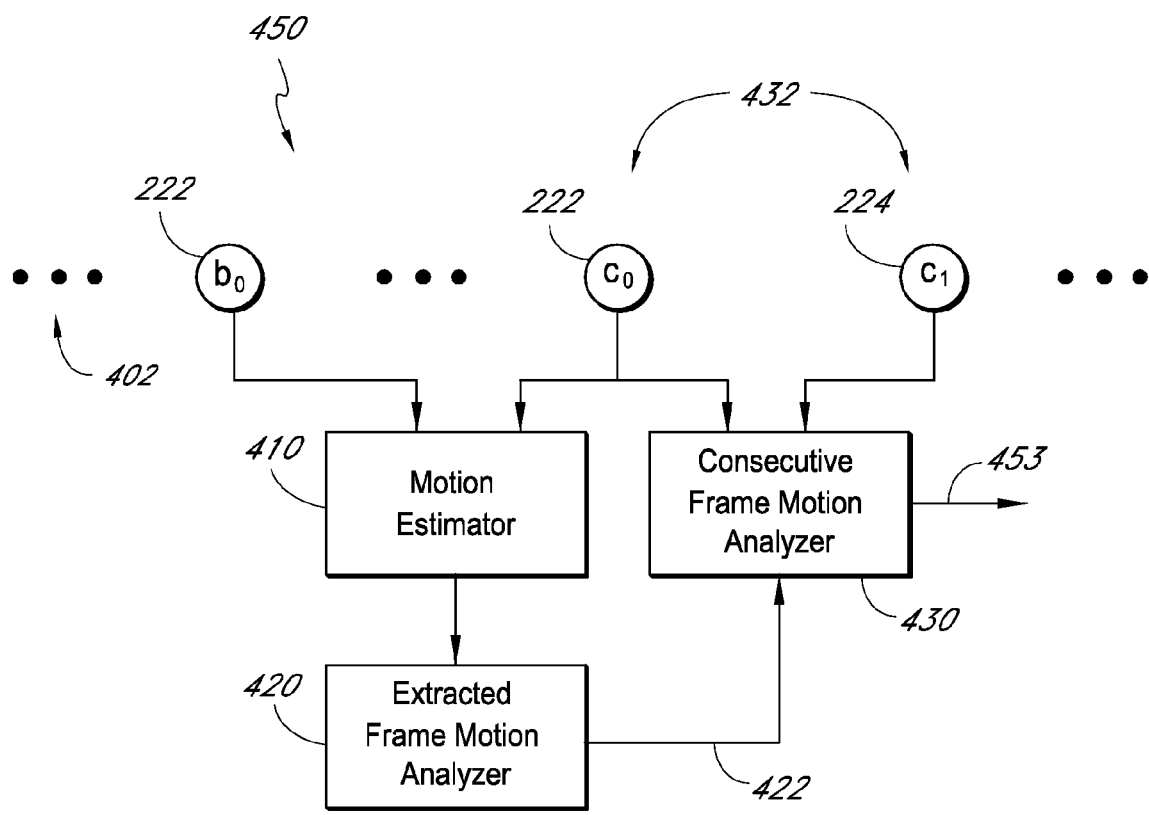
FIG. 4 is a functional block diagram illustrating an embodiment of a scrolling text detector.

FIG. 4 illustrates a detailed implementation of a scrolling text detector 450. The scrolling text detector 450 includes a motion estimator 410, an extracted frame motion analyzer 420, and a consecutive frame motion analyzer 430. In one implementation, the motion estimator 410, extracted frame motion analyzer 420, and consecutive frame motion analyzers 430 are software components implemented in an embedded computer system, such as may be found in a television set. These components are shown as separate blocks; however, in certain embodiments, these components may share underlying logic or code.

The motion estimator 410 in the depicted embodiment receives extracted frames 218 and estimates motion between the extracted frames 218. As discussed above, the extracted frames 218 can include motion in the video sequence because each extracted frame 218 is the start of a repeated set of three or two frames. In addition, because the scrolling text can move in non-extracted as well as extracted frames, the motion estimator 410 of certain embodiments estimates both film and scrolling text motion. The depicted embodiment shows example extracted frames 218 $b_0$ and $c_0$ being provided to the motion estimator 410. However, in various implementations, the other extracted frames 218 of the mixed-mode video sequence are analyzed by the motion estimator 410, as indicated by ellipses 402.

In one implementation, the motion estimator 410 performs a motion estimation algorithm to estimate motion between the extracted frames 218. This algorithm may be a simple block-matching algorithm or a more complex algorithm, such as a 3-D recursive motion estimation (RME) algorithm. For example, if a block-matching algorithm were used, the extracted frames 218 could be divided into blocks of pixels. The pixel values in the blocks of a first extracted frame 218 are estimated by a displaced block of similar shape and size in a second, previous extracted frame 218. This method finds (or attempts to find) the theoretical best match for a block of the first extracted frame 218 within a search area in the second extracted frame 218. Estimating motion results in a motion vector, which represents the geometrical displacement between the two matched blocks. The motion vector is determined by finding a vector that essentially minimizes a cost function that is a measure of mismatch between the reference and the target blocks. For an image divided into several blocks, the block-matching algorithm provides a field of motion vectors.

The motion estimator 410 of certain embodiments provides motion vectors or a motion vector field to the extracted frame motion analyzer 420. The extracted frame motion analyzer 420 analyzes the motion vector field corresponding to the extracted frames 218 to detect constant or substantially constant motion between the extracted frames 218. Constant motion in certain embodiments is indicative of scrolling text when the text scrolls at a constant rate. In some embodiments, the extracted frame motion analyzer 420 analyzes the extracted frames 218 for the presence of motion in a single direction. Such motion can be indicative of scrolling text, which may move in a single direction when, for instance, a ticker scrolls across a display. In addition, in one implementation, the extracted frame motion analyzer 420 analyzes the motion vectors in a location of the frames that corresponds to a border, such as at or near the bottom, top, or side of the frame.

In an embodiment, the motion estimator 410 provides an indicator 422 to the consecutive frame motion analyzer 430. The indicator 422 of certain embodiments provides an indication that horizontal motion, and hence scrolling text, may be present between the two extracted frames 218. In one embodiment, the consecutive frame motion analyzer 430 performs further analysis when the indicator 422 provides an indication of the possible existence of scrolling text. If the indicator 422 does not indicate the possible existence of scrolling text, the consecutive frame motion analyzer 430 does not perform further analysis. Alternatively, the consecutive frame motion analyzer 430 performs further analysis regardless of the indication provided by the indicator 422.

The consecutive frame motion analyzer 430 of various embodiments analyzes consecutive frames 432 to detect the presence of scrolling text between the consecutive frames 432. Consecutive frames 432 include extracted frames 218 and non-extracted frames 220 that follow one another in the mixed-mode video sequence. Thus, in the depicted embodiment, non-extracted frame $c_1$ is a consecutive frame 432 to extracted frame $c_0$ 218 because frame $c_1$ follows frame $c_0$ in the mixed-mode video sequence. In various implementations, additional consecutive frames 220 of the mixed-mode video sequence are analyzed by the consecutive frame motion analyzer 430, as indicated by the ellipses 402.

Various embodiments of the consecutive frame motion analyzer 430 calculate differences in pixel values between blocks of a first consecutive frame 432 and a previous consecutive frame 432. If there is text in the consecutive frames 432, the text in the previous consecutive frame may be offset (e.g., at a different position) from the text in the first consecutive frame 432, due to the motion of the text. Thus, in an embodiment, the consecutive frame motion analyzer 430 analyzes blocks at the same position in each consecutive frame 432. If the differences between these blocks are large, there may be text at an offset in the previous consecutive frame 432. The consecutive frame motion analyzer 430 may further analyze blocks offset from each other. If the pixel value differences between these blocks are small, there may be scrolling text in the blocks. More detailed examples of these block-based comparisons are described with respect to FIGS. 7 and 8, below.

The consecutive frame motion analyzer 430 outputs an indicator 453 in certain embodiments. In various embodiments, the indicator 453 is indicative of whether scrolling text is present between the consecutive frames 432. In an embodiment, the indicator 453 is the output of the scrolling text detector 450.

Figure 5:
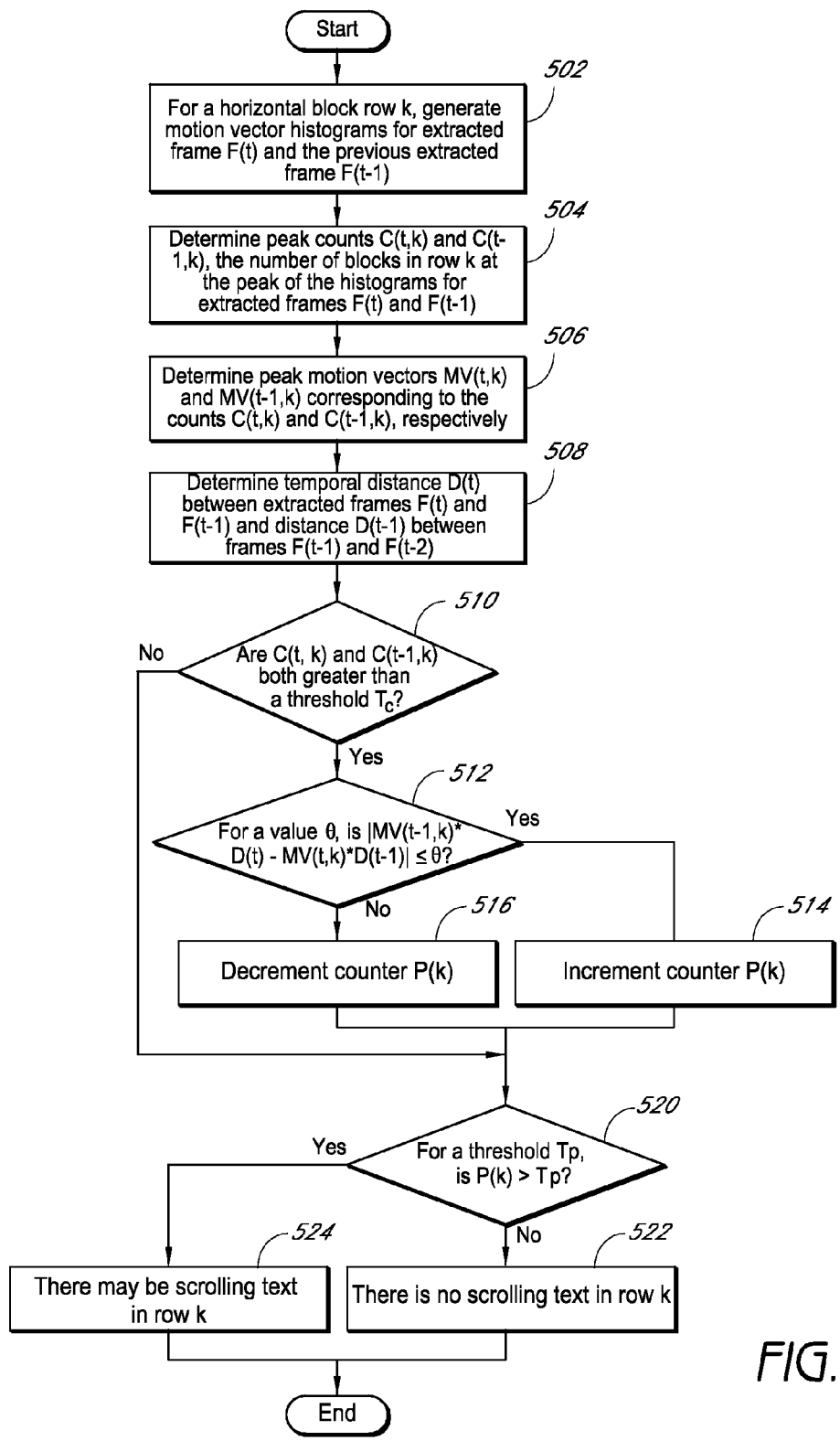
FIG. 5 is a flowchart illustrating an embodiment of a process for detecting scrolling text in a mixed-mode video sequence.

FIG. 5 illustrates an embodiment of the process for detecting scrolling text in a mixed-mode video sequence. In an embodiment, the various functions of the process are performed by a scrolling text detector, such as the scrolling text detector 450 of FIG. 4. More specifically, in certain embodiments the functions of the process are performed by the extracted frame motion analyzer 420.

At 502, for a horizontal block row k, the process generates motion vector histograms for extracted frame F(t) and the previous extracted frame F(t−1). In an embodiment, the process generates the motion vector histograms by analyzing motion vector fields provided by a motion estimator, such as the motion estimator 410 of FIG. 4. Optionally, this step may be performed directly by the motion estimator.

The variable "t" in F(t) and F(t−1) in one implementation refers to the temporal position of an extracted frame, where t takes on integer values. Thus, for example, if an extracted frame at time t in FIG. 2 is the frame $c_0$, then the extracted frame at time t−1 is the frame $b_0$, and the extracted frame at time t−2 is the frame $a_0$. In one implementation, the process evaluates additional pairs of extracted frames as t increases. Thus, for example, the process might evaluate frames $a_0$ and $b_0$, followed by frames $b_0$ and $c_0$, followed by frames $c_0$ and $d_0$, and so on.

Figure 6:
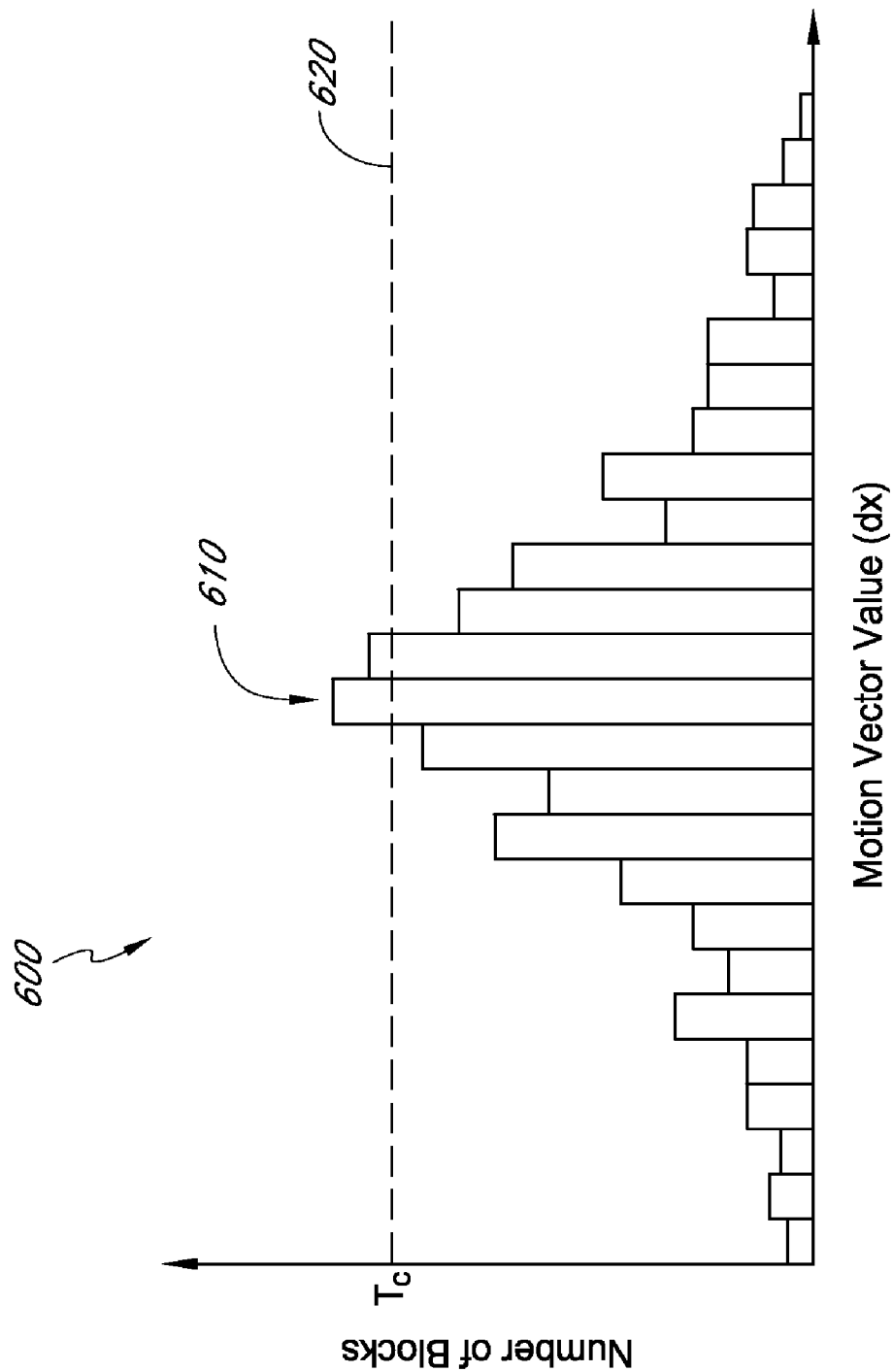
FIG. 6 is a histogram of motion vector valves in accordance with the process of FIG. 5.

Turning to FIG. 6, an example histogram 600 for the extracted frame F(t) generated by the analyzer 420 is shown. The histogram 600 graphs motion vector values versus the number of blocks in a row k of the extracted frame F(t) that have a particular motion vector value. The motion vector values in the depicted embodiment are horizontal motion vector values. The term "dx" in parentheses indicates that the motion vectors are valued as changes in x, e.g., changes in horizontal position between the extracted frame F(t) and F(t−1).

Referring back to FIG. 5, the subfunction 504 determines peak counts C(t,k) and C(t−1,k), which are the number of blocks in the row k at the peak of the histograms for extracted frames F(t) and F(t−1), respectively. Referring again to FIG. 6, an example peak 610 is shown. The peak 610 reflects a motion vector value common to the largest number of blocks.

Turning back to FIG. 5, at 506, peak motion vectors MV(t, k) and MV(t−1,k) corresponding to the counts C(t,k) and C(t−1,k), respectively, are determined. The peak motion vector MV(t,k) is the motion vector value at the peak 610 of the histogram 600. Similarly, the peak motion vector MV(t−1,k) is the motion vector value at a peak of a histogram (not shown) corresponding to extracted frame F(t−1). The peak motion vector MV(t,k,) is measured between extracted frames F(t) and F(t−1), and the peak motion vector MV(t−1, k,) is measured between extracted frames F(t−1) and F(t−2).

At 508, a temporal distance D(t) between extracted frames F(t) and F(t−1) and a temporal distance D(t−1) between extracted frames F(t−1) and F(t−2) is determined. In one implementation, the temporal distance is the distance in consecutive frames between an extracted frame and the previous extracted frame. For instance, referring to FIG. 2, the temporal distance between extracted frames $b_0$ and $a_0$ is 3, whereas the temporal distance between extracted frames $c_0$ and $b_0$ is 2.

At 510, it is determined whether peak counts C(t, k) and C(t−1,k) are both greater than a threshold $T_c$. An example threshold 620 is depicted graphically on the histogram 600 of FIG. 6. If both peak counts C(t, k) and C(t−1,k) are greater than this threshold, the horizontal motion between extracted frames F(t) and F(t−1) might include scrolling text. In an embodiment, the threshold $T_c$ can be derived based on the number of extracted frames in the mixed-mode video sequence.

If the threshold is not exceeded, the analyzer 420 proceeds to step 520. However, if the threshold is exceeded, for a value θ, the analyzer 420 at 512 determines whether $$|MV(t-1,k)*D(t)-MV(t,k)*D(t-1)| \leq \theta, \quad (1)$$

or equivalently, whether $$MV(t-1,k)*D(t)-\theta \leq MV(t,k)*D(t-1) \leq MV(t-1,k)*D(t)+\theta. \quad (2)$$

Using condition (1) or (2), the analyzer 420 effectively determines whether the product of MV(t−1,k) and D(t) and the product of MV(t,k) and D(t−1) are the same or substantially similar. If they are the same, then |MV(t−1,k)*D(t)−MV(t,k)*D(t−1)| equals 0. If they are similar, then |MV(t−1,k)*D(t)−MV(t,k)*D(t−1)| is very small, e.g., is less than some value θ. The value θ may therefore be adjusted to allow a slight difference between MV(t−1,k)*D(t) and MV(t,k)*D(t−1).

If condition (1) is satisfied, the horizontal motion between a row k in the frames F(t) and F(t−1) and the same row k in the frames F(t−1) and F(t−2) is equal or approximately equal. Equal or substantially equal horizontal motion in the row k over multiple extracted frames may be indicative of the presence of horizontal scrolling text in those frames, since scrolling text may be moving at a constant (or substantially constant) horizontal rate.

To further understand condition (1), condition (1) may be rewritten in the form $$\frac{|MV(t-1,k)|}{|D(t-1)|} \approx \frac{|MV(t,k)|}{|D(t)|}. \quad (3)$$

Expression (3) illustrates that the number of pixels in the peak motion vector MV(t−1,k) spread over D(t−1) frames is equal to or approximately equal to the number of pixels in the peak motion vector MV(t,k) spread over D(t) frames. Both the left-hand side (LHS) and the right-hand side (RHS) of (3) represent the average number of pixels per consecutive frame that a peak number of blocks moved. If the LHS and RHS of (3) are equal or approximately equal, then a peak number of blocks are moving, on average, at the same rate through the consecutive frames between extracted frames F(t−2) and F(t). Thus, if the LHS and RHS of (3) are equal or approximately equal, there may be scrolling text in the row k of these extracted frames.

An example will be used to illustrate these principles. First, assume that D(t) is 2 and D(t−1) is 3. The peak motion vector MV(t) in this example is found to be 8, with units of pixels. The peak motion vector MV(t−1) is found to be 12 pixels. In this case, MV(t−1,k)*D(t)−MV(t,k)*D(t−1) can be evaluated to be 12*2−8*3, which equals 0. Thus, condition (1) is satisfied. Using expression (3), a peak motion vector of 12 pixels spread over 3 frames is equal to 4 pixels per consecutive frame, and a peak motion vector of 8 pixels spread over 2 frames is also equal to 4 pixels per consecutive frame. Thus, on average, between frames F(t−2) and F(t), a peak number of blocks are moving at 4 pixels per consecutive frame. Since each side of (3) is equal in this example (e.g., condition (1) is satisfied), there is likely horizontal motion between the extracted frames F(t), F(t−1), and F(t−2).

If condition (1) is satisfied, the analyzer 420 in certain embodiments at 514 increments a counter P(k). Otherwise, the analyzer 420 at 516 of certain embodiments decrements the counter P(k). In one implementation, the counter P(k) is initialized (e.g., set to 0 or another number) when the process begins. As t increases, the analyzer 420 analyzes additional pairs of extracted frames, and the counter P(k) is decremented or incremented for each pair of extracted frames.

Thereafter, the analyzer 420 determines at 520 whether for a threshold $T_p$, if P(k)>$T_p$. If so, the analyzer 420 determines that there may be scrolling text in row k. Otherwise, the analyzer 420 determines that there is no scrolling text in row k. Thus, in an embodiment, the counter P(k) is an indicator of the likelihood that scrolling text is present in one or more extracted frames.

Figure 7:
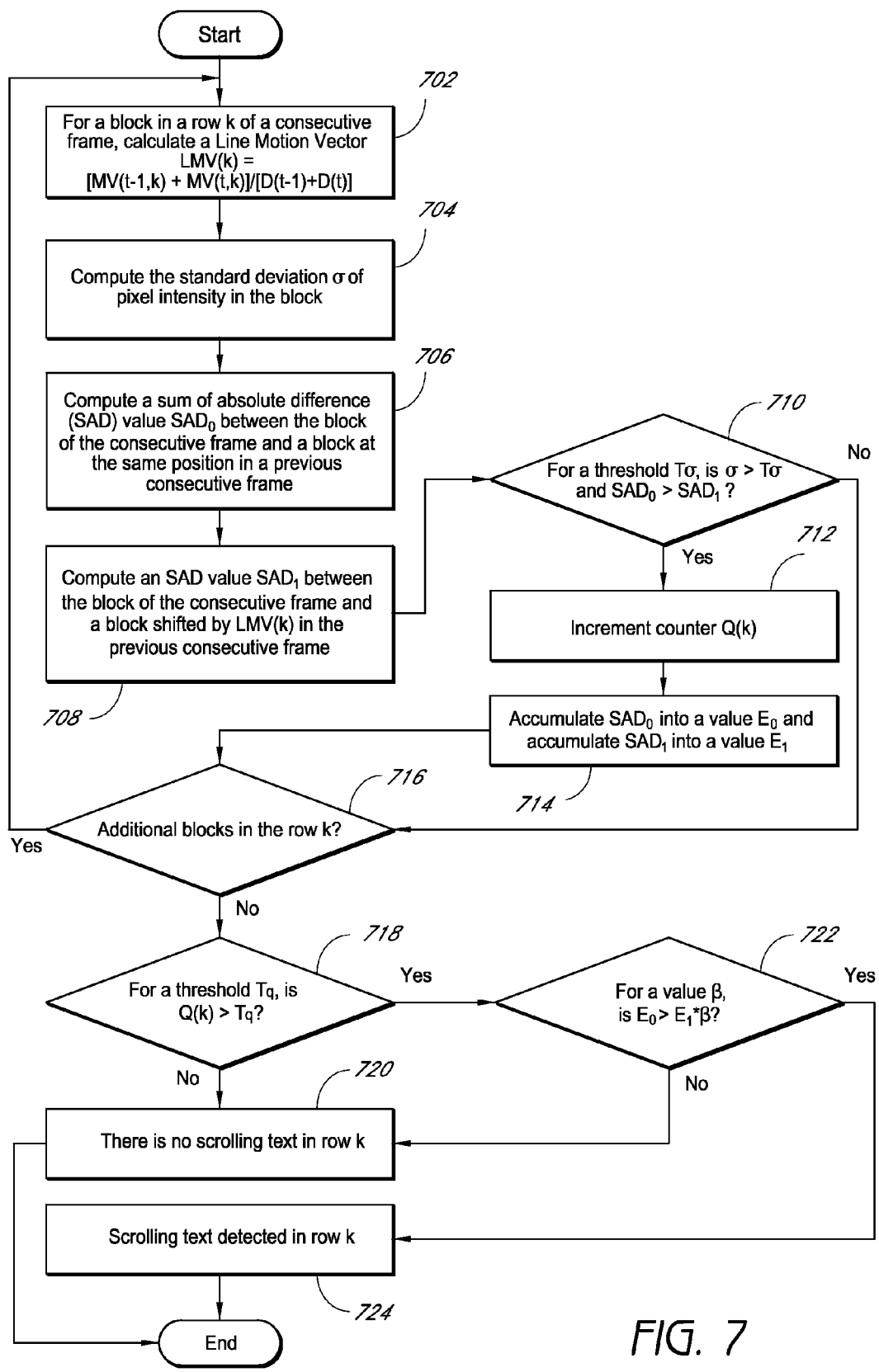
FIG. 7 is a flowchart illustrating a process for detecting scrolling text in a mixed-mode video sequence.

FIG. 7 illustrates an embodiment of the process for detecting scrolling text in a mixed-mode video sequence. In an embodiment, the various functions of the process are performed by a scrolling text detector, such as the scrolling text detector 450 of FIG. 4. More specifically, in certain embodiments the functions of the process 500 are performed by the consecutive frame motion analyzer 430. In addition, in one embodiment, the process is performed in response to the analyzer 420 determining that the counter P(k) is greater than the threshold $T_p$; that is, the process is performed if there is an indication of scrolling text in the row k.

At 702, for a block in a row k of a consecutive frame (which may be the row k evaluated by the analyzer 420), the analyzer 430 calculates a horizontal Line Motion Vector, LMV(k), with magnitude equal to $$\frac{MV(t,k) + MV(t-1,k)}{D(t) + D(t-1)}. \quad (4)$$

Using the example listed above under FIG. 5, expression (4) evaluates to (8+12)/(2+3), which is equal to 4. The purpose of the LMV(k) will be described in detail below, with respect to step 708.

At 704, the analyzer 430 computes the standard deviation σ of pixel intensity in the block. In an embodiment, the standard deviation σ of pixel intensity is a measure of the variation of pixel intensity values in the block. If the standard deviation is low, there is little variation in the block, and vice versa. A higher standard deviation in one implementation is indicative of the presence of text in the block, since there is likely pixel intensity variation when text is present.

The analyzer 430 at 706 computes a sum of absolute difference (SAD) value $SAD_0$ between the block of the consecutive frame and a block at the same position in a previous consecutive frame. The value $SAD_0$ in one embodiment is a sum of the absolute differences between pixel values in each block. As such, the lower the $SAD_0$ value, the more similar the blocks are, and vice versa. It will be noted that the calculation of an SAD value may be replaced with an alternative value, such as the mean absolute difference or squared sum of the absolute difference.

At 708, the analyzer 430 computes an SAD value $SAD_1$ between the block of the current frame and a block shifted to the left (or in some embodiments, to the right) by the LMV(k) in the previous consecutive frame. When scrolling text is present, in one implementation the block shifted to the left by the LMV(k) in the previous consecutive frame includes the same or substantially the same pixels as the block in the consecutive frame. Thus, the value $SAD_1$, if low, indicates that pixels (and hence text) have moved between the consecutive frames.

In an embodiment, the analyzer 430 calculates the SAD values between consecutive frames in a set of three or two repeated frames but not between consecutive frames of different sets. Thus, for example, referring again to FIG. 2, the analyzer 430 might calculate SAD values between $a_0$ and $a_1$ and between $a_1$ and $a_2$, but not between $a_2$ and $b_0$. Advantageously, film motion is repeated in the sets of three and two frames, but scrolling text might not be. As a result, computing the SAD values between repeated frames facilitates detecting scrolling text.

Figure 8A:
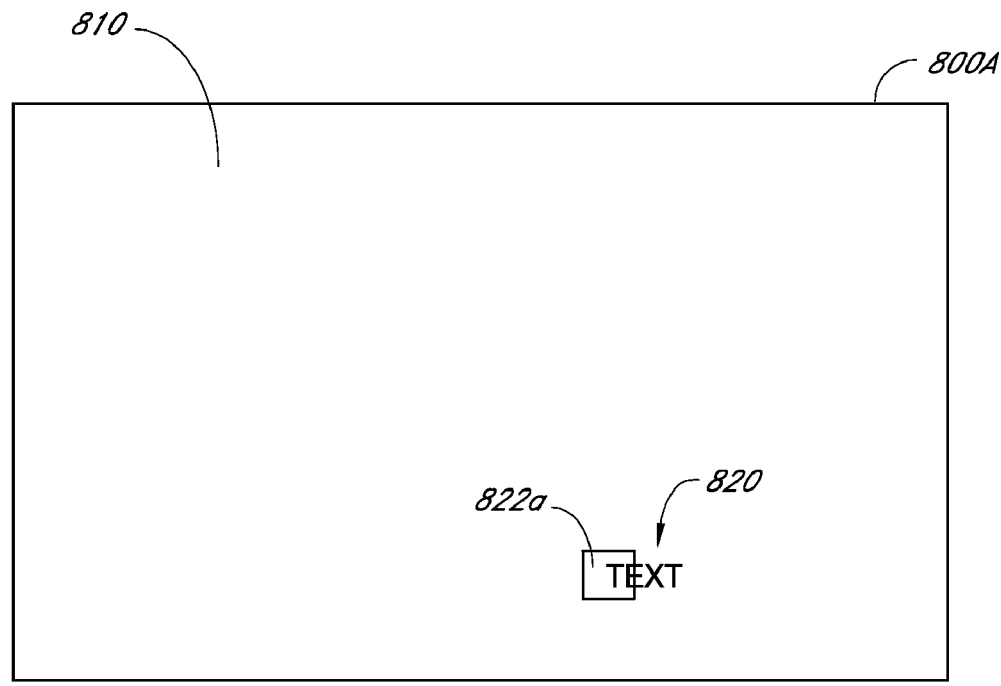
FIGS. 8A & 8B are diagrams illustrating an embodiment of a sum of absolute difference operation in accordance with the process of FIG. 7.
Figure 8B:
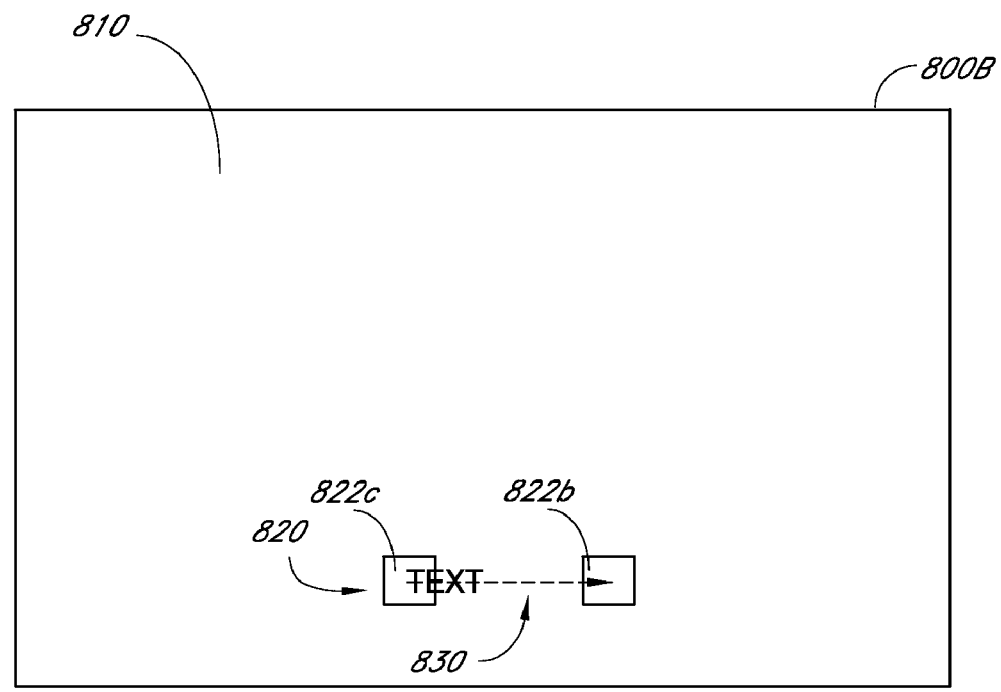

Referring to FIGS. 8A and 8B, an example illustration of the $SAD_0$ and $SAD_1$ calculation is shown. A consecutive frame 800A and a previous consecutive frame 800B including film 810 and scrolling text 820 are shown in FIG. 8A. A block 822a in the consecutive frame 800A is compared with a corresponding block 822b in the previous consecutive frame 800B, shown in FIG. 8B. Both the block 822a and the block 822b are in the same position in their respective consecutive frame 800A, 800B. Likewise, the block 822a is compared with a block 822c, which is a block in the previous consecutive frame 800B, offset from the block 822b by a LMV(k).

The scrolling text 820 is shown in a different position in the previous consecutive frame 800B than in the consecutive frame 800A. As a result, the value $SAD_0$ calculated between the block 822a and the block 822b will be high, since the pixel values in these blocks 822a, 822b are different. On the other hand, the value $SAD_1$ calculated between the block 822a and the block 822c will be low (or zero), since the pixels in these blocks are the same or substantially the same.

Turning back to FIG. 7, the analyzer 430 at 710 determines for a threshold $T\sigma$, whether $\sigma > T\sigma$ and whether $SAD_0 > SAD_1$. If both of these conditions are satisfied, then the analyzer 430 increments a counter Q(k) at 712 and accumulates $SAD_0$ into a value $E_0$ and accumulates $SAD_1$ into a value $E_1$ at 714. In effect, the analyzer 430 of certain embodiments determines whether there is enough variation (e.g., standard deviation) in the block and analyzes the SAD values to determine the likelihood of scrolling text existing in the block.

If the conditions of step 710 are not met, the analyzer 430 determines whether to evaluate additional blocks in the row k. If there are additional blocks to evaluate, the process loops back to 702.

If there are no additional blocks in the row k, the analyzer 430 determines at 718 for a threshold $T_q$, whether the counter $Q(k) > T_q$. If not, the analyzer 430 determines that there is no scrolling text in the row k at 720. In an embodiment, the counter Q(k) is therefore an indicator of the presence of scrolling text in row k of the consecutive frame. In effect, the counter Q(k) of certain embodiments is initialized for each consecutive frame and then increased for each block in the row k of that frame that satisfies the conditions of step 710.

If, however, Q(k) is not greater than $T_q$, the analyzer 430 makes a further determination at 722. The analyzer 430 at 722 determines whether for a value $\beta > 1$, $E_0 > E_1 * \beta$. In other words, the analyzer 430 determines whether the accumulated $SAD_0$ values are greater than the accumulated $SAD_1$ values, adjusted by a constant (e.g., which may be determined experimentally). If this condition is not satisfied, the analyzer 430 at 720 also determines that there is no scrolling text in the row k. But if this condition is satisfied, the analyzer 430 determines that there is scrolling text detected in the row k at 724.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features as applied to various embodiments, it will be understood that various omissions, substitutions, and changes in the form and details of the device or process illustrated may be made without departing from the spirit of the disclosure. As will be recognized, certain embodiments of the inventions described herein may be embodied within a form that does not provide all of the features and benefits set forth herein, as some features may be used or practiced separately from others. The scope of the inventions is indicated by the appended claims rather than by the foregoing description. All changes which come within the meaning and range of equivalency of the claims are to be embraced within their scope.

What is claimed is:

1. A system for detecting scrolling text in a mixed-mode video sequence, the system comprising:
   a deinterlacer configured to:
      receive a mixed mode video sequence including 3:2 pulldown film and scrolling text mixed with the 3:2 pulldown film, the 3:2 pulldown film having alternating groups of three fields and two fields, and
      deinterlace the three fields and the two fields to create a progressive-scan mixed-mode video sequence; and
   a scrolling text detector including:
      a motion estimator configured to generate a plurality of motion vectors between blocks of two or more extracted frames of the progressive-scan mixed-mode video sequence,
      an extracted frame motion analyzer configured to analyze the motion vectors to detect a rate of movement of the blocks between the two or more extracted frames with a temporal distance between the extracted frames, indicative of the presence of scrolling text in the progressive-scan mixed-mode video sequence, and
      a consecutive frame motion analyzer configured to calculate differences in pixel values between blocks of two or more consecutive frames in the progressive-scan mixed-mode video sequence, indicative of the presence of scrolling text in the progressive-scan mixed-mode video sequence for displaying the scrolling text and the progressive-scan mixed-mode video sequence on a display.

2. The system of claim 1, wherein the extracted frame motion analyzer is further configured to calculate a scrolling text indicator responsive to at least some of the plurality of motion vectors and to temporal distances between the extracted frames.

3. The system of claim 1, wherein the consecutive frame motion analyzer is further configured to calculate differences in pixel values between blocks at the same position in a first consecutive frame and in a previous consecutive frame.

4. The system of claim 1, wherein the consecutive frame motion analyzer is further configured to calculate differences in pixel values between blocks at offset positions in a first consecutive frame and in a previous consecutive frame.

5. A method of detecting scrolling text in a mixed-mode video sequence, the method comprising:
   generating a plurality of motion vectors between blocks of two or more extracted frames of a mixed-mode video sequence;
   analyzing the motion vectors to detect a rate of movement of at least some of the blocks between the two or more extracted frames with a temporal distance between the extracted frames, indicative of the presence of scrolling text in the mixed-mode video sequence; and
   calculating differences in pixel values between blocks of two or more consecutive frames in the mixed-mode video sequence, indicative of the presence of scrolling text in the mixed-mode video sequence for displaying the scrolling text and the mixed-mode video sequence on a display.

6. The method of claim 5, wherein generating the plurality of motion vectors includes:
   generating a first motion vector between a block of a first extracted frame and a corresponding block in a second extracted frame; and
   generating a second motion vector between a block of a second extracted frame and a corresponding block in a third extracted frame.

7. The method of claim 6, wherein analyzing the motion vectors includes calculating a first temporal distance between the first and second extracted frames and a second temporal distance between the second and third extracted frames.

8. The method of claim 7, further comprising calculating a scrolling text indicator by determining whether a product of the first motion vector and the second temporal distance and a product of the second motion vector and the first temporal distance are substantially equal.

9. The method of claim 7, wherein analyzing the motion vectors includes calculating a scrolling text indicator responsive to the first and second motion vectors and the first and second temporal distances, wherein the scrolling text indicator is indicative of the presence of scrolling text in the first and second extracted frames.

10. The method of claim 6, wherein analyzing the motion vectors includes evaluating whether a peak number of blocks in a histogram of motion vector values exceeds a predetermined threshold, wherein the peak number of blocks provides an indicator of the likelihood of the existence of scrolling text in the first and second extracted frames.

11. The method of claim 5, wherein calculating the differences in pixel values includes calculating a first difference in pixel values between blocks at the same position in a first consecutive frame and in a previous consecutive frame.

12. The method of claim 11, wherein calculating the differences in pixel values includes calculating a second difference in pixel values between blocks at offset positions in the first consecutive frame and in the previous consecutive frame.

13. The method of claim 12, further comprising comparing the first difference to the second difference, wherein a greater first difference than the second difference is indicative of the presence of scrolling text in the first and second consecutive frames.

14. The method of claim 11, wherein calculating the second difference includes calculating a line motion vector from a sum of first and second motion vectors divided by a sum of first and second temporal distances.

15. The method of claim 5, further comprising evaluating a standard deviation of pixel values in one or more blocks of the consecutive frames, wherein the standard deviation is further indicative of the presence of scrolling text in the block.

16. The method of claim 5, wherein calculating differences in pixel values includes calculating differences in pixel values between blocks where one or more of the consecutive frames having the blocks is an extracted frame.

17. The method of claim 5, wherein calculating the difference in the pixel values includes calculating the difference in intensity values.

18. A system for detecting scrolling text in a mixed-mode video sequence, the system comprising:
   a motion estimator configured to generate a plurality of motion vectors between blocks of two or more extracted frames of a mixed-mode video sequence;
   an extracted frame motion analyzer configured to analyze the motion vectors to detect a rate of movement of at least some of the blocks between the two or more extracted frames with a temporal distance between the extracted frames, indicative of the presence of scrolling text in the mixed-mode video sequence; and
   a consecutive frame motion analyzer configured to calculate differences in pixel values between blocks of two or more consecutive frames in the mixed-mode video sequence, indicative of the presence of scrolling text in the mixed-mode video sequence for displaying the scrolling text and the mixed-mode video sequence on a display.

19. A method of identifying scrolling text in a mixed-mode video, the method comprising:
   generating a plurality of motion vectors between corresponding blocks of a plurality of frames in a mixed-mode video; and
   analyzing the motion vectors so as to detect a rate of movement in a single direction between the plurality of frames with a temporal distance between the plurality of frames, indicative of the presence of scrolling text in the mixed-mode video for displaying the scrolling text and the mixed-mode video on a display.

20. The method of claim 19, further comprising calculating differences in pixel values between blocks at the same position in a first frame and in a previous frame, wherein the differences in pixel values are further indicative of the presence of scrolling text in the mixed-mode video sequence.

21. The method of claim 19, wherein analyzing the motion vectors includes analyzing the motion vectors in a location of the frames that corresponds to a border.

22. A system for detecting scrolling text in a mixed-mode video sequence, the system comprising:
   means for generating a plurality of motion vectors between blocks of two or more extracted frames of a mixed-mode video sequence;
   means for analyzing the motion vectors to detect a rate of movement of at least some of the blocks between the two or more extracted frames with a temporal distance between the extracted frames, indicative of the presence of scrolling text in the mixed-mode video sequence; and
   means for calculating differences in pixel values between blocks of two or more consecutive frames in the mixed-mode video sequence, indicative of the presence of scrolling text in the mixed-mode video sequence for displaying the scrolling text and the mixed-mode video sequence on a display.

* * * * *